(12) United States Patent
Kuritz et al.

(10) Patent No.: US 11,306,487 B2
(45) Date of Patent: Apr. 19, 2022

(54) RIGID POLYMERIC MODULAR FLOORING PLANK, METHOD OF MAKING SAME, AND METHOD OF USING SAME

(71) Applicant: Mannington Mills, Inc., Salem, NJ (US)

(72) Inventors: Brian Kuritz, Salem, NJ (US); Joseph J. Delarso, Jr., Salem, NJ (US); Terry Marchetta, Salem, NJ (US); James Michael Tuley, Salem, NJ (US)

(73) Assignee: Mannington Mills, Inc., Salem, NJ (US)

( * ) Notice: Subject to any disclaimer, the term of this patent is extended or adjusted under 35 U.S.C. 154(b) by 0 days.

(21) Appl. No.: 16/950,063

(22) Filed: Nov. 17, 2020

(65) Prior Publication Data

US 2021/0164238 A1    Jun. 3, 2021

Related U.S. Application Data

(60) Provisional application No. 62/942,384, filed on Dec. 2, 2019.

(51) Int. Cl.
*E04F 15/10*    (2006.01)
*E04F 15/02*    (2006.01)
(Continued)

(52) U.S. Cl.
CPC .............. *E04F 15/107* (2013.01); *B32B 7/12* (2013.01); *B32B 27/08* (2013.01);
(Continued)

(58) Field of Classification Search
CPC .............. E04F 15/107; E04F 15/02033; E04F 15/02038; E04F 2201/0107;
(Continued)

(56) References Cited

U.S. PATENT DOCUMENTS 2,130,911 A * 9/1938 Teunon ................. E04F 13/147
52/315
4,349,588 A * 9/1982 Schiffer .................... B44F 9/04
427/230

(Continued)

FOREIGN PATENT DOCUMENTS

CN         107476536 A       12/2017
DE   202011107236 U1 *  11/2011  ............... B32B 3/06
(Continued)

*Primary Examiner* — Brent W Herring
(74) *Attorney, Agent, or Firm* — Kilyk & Bowersox, P.L.L.C.

(57) ABSTRACT

A rigid polymeric modular flooring plank can be one continuous piece having a top surface, a bottom surface and multiple sides defining the edges of said rigid polymeric modular flooring plank. The rigid polymeric modular flooring plank can include the appearance of multiple tiles or one tile as part of the top surface, with each of the multiple tiles having multiple simulated sides and a decorative surface, and each tile is completely surrounded by simulated grout lines that have a depth and either have a full width W or a half width ½W. Any simulated grout line that is located at any of said multiple sides has the half width and all other simulated grout lines have the full width. The rigid polymeric modular flooring plank has at least a polymeric base layer, a decorative layer, and a wear layer located above the decorative layer.

19 Claims, 7 Drawing Sheets

(51) Int. Cl.
  *B32B 7/12* (2006.01)
  *B32B 27/08* (2006.01)
(52) U.S. Cl.
  CPC .. *E04F 15/02033* (2013.01); *E04F 15/02038* (2013.01); *B32B 2250/03* (2013.01); *B32B 2250/04* (2013.01); *B32B 2250/24* (2013.01); *B32B 2250/44* (2013.01); *B32B 2307/402* (2013.01); *B32B 2307/536* (2013.01); *B32B 2419/04* (2013.01); *E04F 2201/0107* (2013.01); *E04F 2201/0153* (2013.01); *E04F 2201/023* (2013.01); *E04F 2201/043* (2013.01)
(58) Field of Classification Search
  CPC ........ E04F 2201/0153; E04F 2201/023; E04F 2201/043; E04F 15/105; E04F 2203/02; B32B 7/12; B32B 27/08; B32B 2250/03; B32B 2250/04; B32B 2250/24; B32B 2250/44; B32B 2307/402; B32B 2307/536; B32B 2419/04; B32B 2255/12; B32B 3/02; B32B 2260/028; B32B 23/046; B32B 23/18; B32B 25/042; B32B 25/14; B32B 2262/101; B32B 2262/106; B32B 2262/14; B32B 2264/067; B32B 2264/102; B32B 2264/104; B32B 2451/00; B32B 23/04; B32B 25/02; B32B 25/08; B32B 25/12; B32B 2264/12; B32B 27/10; B32B 27/18; B32B 27/20; B32B 27/281; B32B 27/283; B32B 27/288; B32B 27/302; B32B 27/304; B32B 27/306; B32B 27/308; B32B 27/36; B32B 27/42; B32B 2264/108; B32B 27/365; B32B 2264/101; B32B 23/20; B32B 27/22; B32B 27/32; B32B 27/40; B32B 2260/046; B32B 2264/0214; B32B 23/08; B32B 25/16; B32B 27/285; B32B 2262/10; B32B 27/28; B32B 2255/26; B32B 27/34; B32B 2264/062; B32B 2264/10; B32B 2270/00; B32B 2274/00; B32B 2307/50; B32B 2307/54; B32B 2307/732

USPC ............. 52/220.1, 311.1, 314, 417, 437, 438
See application file for complete search history.

(56) References Cited

U.S. PATENT DOCUMENTS

| | | | |
|---|---|---|---|
| 4,581,255 A | 4/1986 | Coggan et al. | |
| 5,052,160 A | 10/1991 | Gentsch et al. | |
| 5,372,676 A * | 12/1994 | Lowe | B28B 7/007 |
| | | | 216/30 |
| 5,444,953 A | 8/1995 | Koenig et al. | |
| 5,447,752 A * | 9/1995 | Cobb | B44F 9/04 |
| | | | 427/270 |
| 5,637,236 A * | 6/1997 | Lowe | B28B 7/007 |
| | | | 216/30 |
| 5,945,181 A | 8/1999 | Fisher | |
| 6,986,934 B2 | 1/2006 | Chen et al. | |
| 7,288,310 B2 | 10/2007 | Hardwick | |
| 7,930,865 B2 | 4/2011 | Barlow | |
| 8,099,919 B2 | 1/2012 | Garcia | |
| 8,875,460 B2 * | 11/2014 | Cruz Garcia | E04F 15/02033 |
| | | | 52/390 |
| 9,518,392 B2 | 12/2016 | Morneau et al. | |
| 9,776,382 B2 | 10/2017 | Bushey et al. | |
| 10,066,393 B1 * | 9/2018 | Menendez | E04C 2/02 |
| 10,087,585 B2 | 10/2018 | Dignard et al. | |
| 10,233,656 B2 | 3/2019 | Courey et al. | |
| 2005/0188643 A1 * | 9/2005 | McGrath | B44F 9/04 |
| | | | 52/506.01 |
| 2006/0024465 A1 * | 2/2006 | Briere | B32B 3/04 |
| | | | 428/60 |
| 2008/0005988 A1 | 1/2008 | Dombowsky | |
| 2008/0115437 A1 | 5/2008 | Bordener | |
| 2009/0226662 A1 | 9/2009 | Dyczko-Riglin et al. | |
| 2014/0360117 A1 * | 12/2014 | Ko | E04F 15/02016 |
| | | | 52/309.1 |
| 2017/0114504 A1 | 4/2017 | Karau | |
| 2018/0058077 A1 * | 3/2018 | Alfieri | B32B 3/263 |
| 2018/0298621 A1 * | 10/2018 | Courey | E04F 15/107 |
| 2018/0298622 A1 * | 10/2018 | Courey | E04F 15/107 |

FOREIGN PATENT DOCUMENTS

| | | | | |
|---|---|---|---|---|
| EP | 2586929 A1 * | 5/2013 | ............ | E04F 15/105 |
| ES | 2735995 T3 * | 12/2019 | ........ | E04F 15/02172 |
| WO | WO-9606716 A1 * | 3/1996 | ............. | B28B 11/04 |

* cited by examiner

RIGID POLYMERIC MODULAR FLOORING PLANK, METHOD OF MAKING SAME, AND METHOD OF USING SAME

This application claims the benefit under 35 U.S.C. § 119(e) of prior U.S. Provisional Patent Application No. 62/942,384, filed Dec. 2, 2019, which is incorporated in its entirety by reference herein.

The present invention relates to a rigid polymeric modular flooring plank, a flooring system including the rigid polymeric modular flooring plank, a method of installing the rigid polymeric modular flooring plank, a method of making the rigid polymeric modular flooring plank, and a packaged flooring system.

BACKGROUND OF THE INVENTION

The use of modular flooring planks to produce a floor is a common technique to quickly produce high-quality floors in both residential and commercial settings. These flooring planks must be aligned during installation and immobilized on the underlying floor, which can be accomplished with either a pressure sensitive adhesive attached to the underside of the individual flooring planks or an adhesive composition applied to the underlying floor structure and/or to the plank.

One complicating factor in the application of flooring planks is the spacing of adjacent flooring planks. The same technique used to lay ceramic tiles is generally used to lay planks that wish to simulate ceramic tile patterns and aesthetics. A known method of installing tiles requires setting a tile down, and thereafter, installing spacers at corners of the first tile, and, thereafter, setting a second tile that abuts the spacers. The spacers are generally uniform in size and allow for consistent spacing between tiles when the tiles are placed on the floor. Once the tiles are placed on the floor and secured, the spaces in between adjacent tiles are filled with grout or simulated grout material like caulk. The use of spacers can complicate the installation process, because it adds significantly to the installation time and adds complexity to the project. Further, if a set of spacers includes a spacer that is not the same size or shape as the other spacers and is inadvertently used during installation, the tiles may be mis-aligned during installation. Additional time must be taken to remove the mis-aligned tiles, find the improperly-sized spacer, replace the spacer, and re-install the tiles.

The size of individual tiles can also be a complicating factor when installing a floor. If individual tiles are small in size, a large number of tiles are generally needed, which in turn can require more spacers and more grout to complete the flooring installation.

In view of the foregoing, an improved flooring system is needed that can be used without spacers and address one or more of the disadvantages recited above.

SUMMARY OF THE PRESENT INVENTION

It is a feature of the present invention to provide a flooring system that can be installed without the use of any spacers, yet create a uniformly spaced installation ready for application of decorative grout.

Another feature of the present invention is to provide individual flooring planks that are relatively large in size and has, or can include, the appearance of multiple tiles as a top surface of the rigid polymeric modular flooring plank.

A further feature of the present invention is to provide the ability to have multiple tiles laid in uniform spacing without the seams being visible between the tiles once decorative grout is applied An additional feature of the present invention is to provide planks that permit one to easily lay a tile floor with less labor and effort, and yet achieve a floor of high quality.

Additional features and advantages of the present invention will be set forth in part in the description that follows, and in part will be apparent from the description, or may be learned by practice of the present invention. The objectives and other advantages of the present invention will be realized and attained by means of the elements and combinations particularly pointed out in the description and appended claims.

One or more of the foregoing features have been accomplished in accordance with this invention by providing a rigid polymeric modular flooring plank that is one continuous piece having a top surface, a bottom surface and multiple sides defining the edges of the rigid polymeric modular flooring plank. The rigid polymeric modular flooring plank can include the appearance of a single tile or multiple tiles as part of the top surface with each of the multiple tiles, when present, having multiple simulated sides and each tile having a decorative surface. Each single tile or each of the multiple tiles is completely surrounded by simulated grout lines (e.g., decorative grout lines) that have a depth and either have a full width W or a half width ½W. Any simulated grout line that is located at any of the multiple sides has a half width and all other simulated grout lines have a full width. The rigid polymeric modular flooring plank includes a polymeric base layer, a decorative layer, and at least one wear layer located above the decorative layer. The simulated grout lines are formed by removing portions or sections of at least the wear layer and decorative layer.

The present invention further relates to a flooring system that utilizes the rigid polymeric modular flooring plank of the present invention, which is a first rigid polymeric modular flooring plank, and a second rigid polymeric modular flooring plank of the same size and shape (or a complimentary size and shape) as the first rigid polymeric modular flooring plank. The first rigid polymeric modular flooring plank and the second rigid polymeric modular flooring plank are arranged adjacent to one another, such that one or more of the free edges of the first rigid polymeric modular flooring plank and one or more of free edges of the second rigid polymeric modular flooring plank together form a grouting groove having the depth and full width W of the simulated grout line.

The present invention further relates to a method of installing the flooring system of the present invention. The method can include placing, on a floor, the first rigid polymeric modular flooring plank and the second rigid polymeric modular flooring plank. The method can also include aligning the first rigid polymeric modular flooring plank and the second rigid polymeric modular flooring plank together such that the first rigid polymeric modular flooring plank and the second rigid polymeric modular flooring plank are arranged adjacent to one another in a gap-free juxtaposition. The planks abut each other or touch each other to form a seam line. The method can also include filling the grouting groove with grout or a simulated grout material (e.g., decorative grout material).

It is to be understood that both the foregoing general description and the following detailed description are exem-

DETAILED DESCRIPTION OF THE PRESENT INVENTION

Figure 1A:
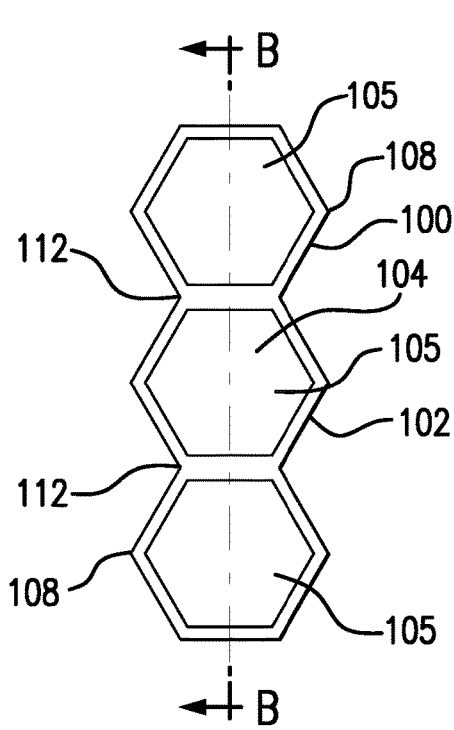
FIG. 1A is a top view of a rigid polymeric modular flooring plank according to the present invention which shows multiple simulated tiles.

The present invention relates to a rigid polymeric modular flooring plank that is one continuous piece. A plurality of rigid polymeric modular flooring planks can be used to produce a floor by adjacently aligning individual flooring planks such that adjacent flooring planks abut each other.

The rigid polymeric modular flooring plank of the present invention comprises, consists essentially of, consists of, includes, or has, a top surface, a bottom surface, and multiple sides defining the edges of the rigid polymeric modular flooring plank. The plank comprises, consists essentially of, consists of, includes a polymeric base layer, a decorative layer, and at least one wear layer located above the decorative layer.

The rigid polymeric modular flooring plank comprises, consists essentially of, consists of, or includes a) the appearance of one or multiple tiles as part of the top surface with the tile or each of the multiple tiles having multiple simulated sides and b) a decorative surface and c) each of the tiles is completely surrounded by simulated grout lines that have a depth and either have a full width W or a half width ½W. Each tile or the multiple tiles on each flooring plank also have the appearance of being connected together as a uniform pattern by way of the simulated grout receiving lines.

The simulated grout receiving lines of full width W or half width (½W) have a depth, where the depth can be obtained by routing or otherwise removing at least portions of at least the wear layer and decorative layer and can further be formed by remove a portion of the upper surface of the polymeric base layer. In forming the simulated grout lines, some portion of at least the base layer is retained so as to keep the integrity of the overall plank. The routing can take place with a router configured to rout the plank to form the simulated grout line. The routing can take place with a computer numeric control (CNC) tool designed to, or configured to, rout based on a pattern to create the appearance of multiple tiles separated by the simulated grout lines on the rigid polymeric modular flooring plank. Other cutting devices or techniques instead of CNC tools can be used such as by laser(s) or water jetting. The simulated grout lines that have a half width ½W can also be formed in the same manner. The ½W simulated grout lines can be either formed by forming a full width W grout line in the plank and then cutting the material forming the plank into the shape of the flooring plank by cutting at the mid-point of the simulated grout line to form the ½W width. In the alternative, the ½W simulated grout line can be formed by the router as a ½W grout line at the same time or after the starting material forming the plank is cut into the shape/dimensions of the flooring plank.

Any simulated grout line that is located at any of the multiple sides has the half width (½W) and all other simulated grout lines have the full width (W). This way, when two rigid polymeric modular flooring planks are aligned next to each other, and abut each other, a simulated grout line is formed that has full width W. Further, with such a design, the edge (cut line) of each plank is not seen once decorative grout, caulk or other filler material is used to fill in the simulated grout line. The decorative grout does not provide any joining of the individual flooring planks and is for aesthetics only in that the decorative grout provides the appearance of grout.

The decorative grout gap or simulated grout full width (W) or gap can be, for example, from about ¹⁄₁₆ in. to about ½ in. or more, or from about ¹⁄₁₆ in. to about ¼ in., or from about 0.05 inch to about 0.2 in, or from about 0.1 in to about 0.2 in., or other values. The width or gap can be considered an average full width. The depth of the grout groove in relation to the plank or tile thickness, for example, can be, for example, from about 2% to about 50%, or from about 5% to about 40%, or from about 10% to about 30%, or from about 15% to about 25% of the plank thickness, or other values. For instance, the depth of the simulated grout line can be from about 0.5 nm to about 4 nm or more, from about 0.75 nm to about 4 nm, from about 1 nm to about 3 nm, from about 1 nm to about 2.75 nm and the like. The depth can be considered an average depth.

The rigid polymeric modular flooring plank of the present invention comprises, consists essentially of, consists of, includes, or has, a polymeric base layer, a decorative layer, and at least one wear layer located above the decorative layer. The combination of the polymeric base layer, decorative layer, and at least one wear layer can be in the form of a laminate or a composite sheet. The sheet can be formed by any laminating procedure, including but not limited to, co-extrusion, thermo-fusing, HTHP pressing (high-temperature-high-pressure), adhesives, or any combinations thereof. One or more of each layer can be present, e.g., the rigid polymeric modular flooring plank of the present invention can have one or more polymeric base layers, one or more decorative layers, and one or more wear layers. The flooring plank can have other layers present, such as one or more strengthening layers, underlay layers, intermediate layers, and/or reinforcement layers, and the like.

The flooring plank can have an overall thickness of from about 4 mm to about 15 mm or more, or from about 5 mm to 12 mm, or from 5 mm to 8 mm, or 6 mm to 10 mm or other values. The overall thickness can be considered an average overall thickness.

The flooring plank, once formed, can have a cross-sectional area (per plank) of from about 1 square foot to about 4 square feet or more, such as from about 1.5 square feet to about 4 square feet, or from about 2 square feet to about 4 square feet and the like.

As indicated, the flooring plank can have the appearance of a single tile or of multiple tiles, which can be from 2 or more, such as from about 2 tiles to about 12 or more tiles in appearance per plank. Each tile can have any dimensions, such as from ½ in by ½ in to 18 in by 18 in or larger. The dimensions are with respect to a rectangle, and when the tile has the appearance of multi-sided objects or rounded objects, the cross-sectional area of each tile can be, for instance, from about 1.5 square inches to 300 square inches or more.

As an option, the simulated grout lines that are formed into the flooring plank, whether the full width or half width simulated grout lines, can have a bevel present on each side of the tile edge that forms the simulated grout line. This bevel edge can be a micro-bevel edge. The width of the bevel can be 0.01 mm to 0.1 mm, such as from 0.01 mm to 0.05 mm and the like. The bevel can have an angle of from 5 degrees to 45 degrees such as from 10 degrees to 35 degrees or from 20 degrees to 35 degrees, and the like. The presence of a bevel on the edges of the simulated grout lines can better ensure that the cut edge of the simulated grout lines does not crack or get damaged when walked on. Also, or in the alternative, the presence of the bevel edge can further provide a more realistic appearance and feel of tiles joined together by grout.

The simulated grout lines cut into the flooring plank can have the shape of an open-sided rectangle or square or can be the shape of a half circle or oval, or have any other shapes.

The polymeric base layer or core can be, consists of, consist essentially of, or comprise one or more layers to from the base layer or core. When the base layer has more than one layer, each layer can be the same or different from each other with respect to material, thickness, and physical properties, such as, but not limited to, stiffness (as defined herein).

The polymeric base layer can have a thickness of from about 4 mm to about 15 mm or more, or from about 5 mm to 12 mm, or from 5 mm to 8 mm, or 6 mm to 10 mm or other values. The thickness can be considered an average overall thickness.

The decorative layer and the at least one wear layer can, together, form a layer that gives the appearance of one tile or of multiple tiles. Individual tiles are delineated by simulated grout lines of either full width W or half-width ½W. The polymeric base layer can comprise, include, have, or be, the top surface (or upper surface) and the bottom surface (lower surface) of the rigid polymeric modular flooring plank. The top surface is closer to the walking surface of the plank and have the decorative layer and wear layer located on top of this top surface.

The decorative layer or print layer or décor layer, also called a printed visual, can comprise a gravure print, a digital print, a flexo print, a transfer print, a pad print, a stamping print, a decorative painting, or any combination thereof. Any conventional printing means can be used to produce the décor layer. The printed visual on the décor layer can have any pattern, such as, but not limited to, simulated natural surfaces, such as natural wood, stone, tile, marble, granite, brick appearance, or the like. The decorative layer can have a thickness of 0.5 mm or less, such as 0.3 mm to 0.02 mm and the like.

As a non-limiting example, a décor layer or print layer comprises a design layer that optionally can have chemically or mechanically embossed textures in register so as to simulate such features found in natural surfaces (e.g., grout lines, wood grain, wood knots, ceramic surface textures, and the like). Any ink composition can be used, such as those that contain an acrylic resin, water, alcohol, and one or more pigments. A design can be done in register using multiple station rotogravure printing.

The décor layer can include a substrate, wherein the substrate can comprise one or more polymer (e.g., plastic) films and/or papers (e.g., cellulose). These films may be selected from thermoplastic films, such as acrylic, polyolefin, ionomer, and polyester. Alternatively, a cellulose base paper can be used as the substrate for the décor layer. Examples of cellulose base layers and methods of incorporating them into laminated or surface coverings are described in U.S. Pat. No. 6,986,934, which is incorporated by reference in its entirety herein. Other types of film or materials for the décor layer are possible.

The rigid polymeric modular flooring plank of the present invention can have a corresponding shape or complimentary shape such that an outer edge of one plank abuts a second rigid polymeric modular flooring plank of the same size and shape of the first rigid polymeric modular flooring plank. The rigid polymeric modular flooring plank can be any geometrical shape, such as, for example, circular, triangular, square, non-square rectangular, pentagonal, hexagonal, and di- or tri-variations thereof (e.g., three hexagons aligned together on a single plank to form a tri-hexagonal rigid polymeric modular flooring plank). The flooring plank can have the shape of a herring bone or chevron or other shapes. The plank can have one or more linear sides that define the shape or part of the shape. Generally, the multiple planks that abut each other has complimentary shapes or the same shape so that the planks can be aligned to each other and form full width W simulated grout lines.

In the rigid polymeric modular flooring plank of the present invention, the multiple simulated tiles, when present, are positioned in a common plane.

As an option, the polymeric base layer (and/or the entire flooring plank) has very low amounts of plasticizer present (e.g., less than 5 wt %, less than 2.5 wt %, less than 1 wt %, or less than 0.5 wt % based on the weight of said polymeric base layer), or has no plasticizer present.

The polymeric base layer can have a modulus or rigidity that is considered rigid or stiff. For instance, the polymer base layer can have a Young's modulus of at least 1 GPa, such as at least 1.1 GPa, at least 1.2 GPa, at least 1.3 GPa, or 1 GPa to 15 GPa or more.

The polymeric base layer used in the present invention can have a stiffness as measured by D1037-12 of at least 1 GPa, such as at least 1.1 GPa, at least 1.2 GPa, at least 1.3 GPa, or 1 GPa to 15 GPa or more.

The modular flooring plank of the present invention can have a modulus or rigidity that is considered rigid or stiff. For instance, the modular flooring plank can have a Young's modulus of at least 1 GPa, such as at least 1.1 GPa, at least 1.2 GPa, at least 1.3 GPa, or 1 GPa to 15 GPa or more.

The modular flooring plank of the present invention can have a stiffness as measured by D1037-12 of at least 1 GPa, such as at least 1.1 GPa, at least 1.2 GPa, at least 1.3 GPa, or 1 GPa to 15 GPa or more.

The modular flooring plank of the present invention can have a stiffness such that a 3-foot length of flooring plank will not bend around a one-inch diameter pipe without cracking or breaking.

The rigid polymeric modular flooring plank of the present invention can be a luxury vinyl tile (LVT). For purposes herein, a luxury vinyl tile (LVT) refers to a resilient plank floor covering including the polymeric base and a minor amount (<50 wt %) of inorganic filler (based on the total wt % of the LVT) in the polymer of the polymeric base. The LVT material can meet the requirements of ASTM F 1700, Class III (Printed Film Vinyl Tile). The LVT material can have the decorative layer on the polymeric base. One or more clear (e.g., vinyl) wear layers on top of the print film. The polymeric base layer(s) of LVT can include polymeric material (or "binder"), fillers, and pigments compounded with suitable lubricants and processing aids. In LVT, the polymeric material can be present in an amount of at least 34 wt % polymeric material (or "binder") containing, for example, one or more thermoplastic polymers, such as polymers of vinyl chloride, copolymers of vinyl chloride, or both, and other modifying resins, and can include plasticizers. Further, the polymers and copolymers of vinyl chloride can include at least 60 wt % of the polymer material, and copolymers of vinyl chloride can include at least 85 wt % vinyl chloride.

As another option, the polymer of the polymeric base layer can be at least one polymer. For example, the polymer can be a thermoplastic or thermoset polymer. The polymer can be any polymer, including natural products and synthetic products. Generally, any polymeric material, combination thereof, alloys thereof, or mixtures of two or more polymers can be used to form the polymeric base layer portion. The polymeric material can be, for example, a thermoplastic polymer, a thermosetting polymer, a rubber (elastomer), or any combination thereof. Further, the polymer can be, for example, any type of polymer, such as a homopolymer, random polymer, alternating polymer, graft polymer, block polymer, star-like polymer, comb-like polymer, crosslinked polymer, and/or vulcanized polymer. The polymer can be one or more polyblends. The polymer can be, for example, a thermoplastic elastomer (TPE), an interpenetrating polymer network (IPN); a simultaneous interpenetrating polymer network (SIN); or an interpenetrating elastomeric network (IEN).

The polymer can be, for example, a silicone-containing polymer, for instance, polydimethyl siloxane, fluorosilicones, silicone-organic polymers, or silicone-organic hybrid polymers. Other examples of polymers include, but are not limited to, olefin-containing, diene-containing, and butene-containing polymers and copolymers. Particular examples include elastomers such as solution styrene-butadiene rubber (SBR), natural rubber, emulsion SBR, polybutadiene, polyisobutadiene, polyisoprene, polychloroprene, NBR, EPDM, EPM, isobutene elastomers, and their functionalized or modified derivatives or blends thereof. Other examples of polymers include, but are not limited to, linear and non-linear polymers such as polyethylene, poly(vinylchloride), polyisobutylene, polystyrene(s), polycaprolactam (nylon), polyisoprene, and the like. Other general classes of polymers include polyamides, polycarbonates, polyelectrolytes, polyesters, polyethers, (polyhydroxy)benzenes, polyimides, polymers containing sulfur (such as polysulfides, (polyphenylene) sulfide, and polysulfones), polyolefins, polymethylbenzenes, polystyrene and styrene copolymers (ABS included), acetal polymers, acrylic polymers, acrylonitrile polymers and copolymers, polyolefins containing halogen (such as polyvinyl chloride and polyvinylidene chloride), cellulose acetate, ethylene-vinyl acetate, polyacrylonitrile, fluoropolymers and fluoroplastics, ionomeric polymers, polymers containing ketone group(s), polyketone, liquid crystal polymers, polyamide-imides, polyaryletherketone, polymers containing olefinic double bond(s) (such as polybutadiene, polydicyclopentadiene), polyphenylene oxides, polyurethanes, thermoplastic elastomers, polyolefins (such as polyethylene, 1-butene, polypropylene, 1-hexene, 1-octene, 4-methyl-1-pentene, substituted alpha-olefins, and the like), polyolefin copolymers (such as copolymers of: ethylene, 1-butene, propylene, 1-hexene, 1-octene, 4-methyl-1-pentene and substituted alpha-olefins and the like), polyolefin terpolymers, polycarbonates, silicone polymers, alkyd, epoxy, unsaturated polyester, vinyl ester, urea-, melamine-, or phenol-formaldehyde resins, and the like. Other examples of the polymer can be an acrylic polymer, a methacrylic polymer, a styrenic polymer, or a silicone polymer. The polymer present in the polymeric product of the present invention can be a polyolefin. The molecular weight of the polymer can be, for example, from 10,000 to 1,000,000, or from 50,000 to 500,000, or from 100,000 to 200,000, or other values, based on weight average molecular weight.

The polymeric material can also be a thermoplastic polymer that includes, but is not limited to, vinyl containing thermoplastics such as polyvinyl chloride, polyvinyl acetate, polyvinyl alcohol, and other vinyl and vinylidene resins and copolymers thereof; polyethylenes such as low density polyethylenes and high density polyethylenes and copolymers thereof; styrenes such as ABS, SAN, and polystyrenes and copolymers thereof, polypropylene and copolymers thereof; saturated and unsaturated polyesters; acrylics; polyamides such as nylon containing types; engineering plastics such as acetyl, polycarbonate, polyimide, polysulfone, and polyphenylene oxide and sulfide resins and the like. One or more conductive polymers can be used to form the flooring panel body, which has applications in conductive flooring and the like. The thermoplastic polymers set forth in Kirk Othmer (3rd Edition, 1981) at pp. 328 to 848 of Vol. 18 and pp. 385-498 of Vol. 16, (incorporated in its entirety by reference herein) can also be used as long as the resulting flooring panel body has sufficient strength for its intended purpose.

The polymer can include a vinyl chloride homopolymer and a vinyl copolymer, such as a vinyl chloride-vinyl acetate copolymer, wherein the vinyl chloride homopolymer can be present in the composition in an amount from about 1 wt % to greater than 50% by weight of the combined amount of vinyl chloride homopolymer and a vinyl copolymer, such as vinyl chloride-vinyl acetate copolymer (e.g., from about 1 wt % to about 20 wt %, from about 20 wt % to about 40 wt %, from about 40 wt % to about 60 wt %, about 60 wt % or greater, about 65 wt % or greater, about 70 wt % or greater; or from about 75 wt % to about 99 wt %). As a non-limiting example, the amount of vinyl chloride homopolymer in the virgin polymer can be from about 80 wt % to about 99 wt % based on the weight of the combined amount of vinyl chloride homopolymer and vinyl chloride-vinyl acetate copolymer, or can be from about 70%-99% (or more) by weight of the combined amount of vinyl chloride homopolymer and vinyl chloride-vinyl acetate copolymer, or can be from about 80% to 90% by weight of the combined amount of vinyl chloride homopolymer and vinyl chloride-vinyl acetate copolymer. The vinyl chloride copolymer and homopolymer can have any K-value or molecular weight. Additional properties of the vinyl chloride homopolymer and a vinyl copolymer are described, for example, in U.S. Patent Application Publication No. 2009/0226662, which is incorporated in its entirety by reference herein.

Other ingredients can be present in the base layer or other layers, such as flame retardants, UV stabilizers, antistatic agents, wear resistant particles, antimicrobial additives, pigments, processing aids, dispersion additives, lubricants, colorants, modifying resins, cross-linking agents, antioxidants, foaming agents, tackifiers, and/or other conventional organic or inorganic additives commonly used in polymers.

The filler can be any filler, including any conventional filler. The filler can be a natural filler or a synthetic filler. The filler can be in the form of particles, short fibers, flakes, and other discrete forms. Inorganic filler can be used. Examples of inorganic filler can include, but are not limited to, hydrated alumina, magnesium carbonate, calcium sulfate, silica, precipitated silica, fumed silica, fly ash, cement dust, glass, clay, talc, calcium carbonate, barium sulfate, silicates, aluminum trihydrate, talc, clay, kaolin, wollastonite, gypsum, solid or hollow glass microspheres, and the like. Inorganic fillers can be, for example, mineral fillers. The filler also can be a non-mineral or organic filler such as carbon black, wood flour, cellulose-derived materials, ground rice hulls, solid or hollow temperature resistant polymer microspheres or microbeads (e.g., phenolic microspheres), and the like. Carbon black, for example, can be used as filler in rubber-based base layers, or other types of base layers, of flooring panel tiles. The inorganic and organic fillers can be used in combinations in the base layers, or either type can include the sole type of filler used in the base layers.

The at least one polymeric base layer can be a single layer construction or include a multiple base layer construction, such as including a first base layer containing polyvinyl chloride, inorganic filler, and stabilizer, and a second base layer attached to a lower surface of the first base layer, and so forth. These different base layers can have the same or different compositions. These different base layers can be co-extruded or extruded or molded separately prior to being consolidated together into a unitary base portion by lamination or adhesion, or by other methods.

As an option, at least first and second polymeric base layers can be included in the polymeric base layer portion, where one base layer has a lower wt % polyvinyl chloride, plasticizer, and stabilizer, and a higher wt % inorganic filler, than another base layer. For example, one base layer can include, for example, from 15 wt % to 30 wt % polymer, such as polyvinyl chloride, from 4 wt % to 10 wt % plasticizer, from 50 wt % to 80 wt % filler, and from about 1 wt % to 5 wt % stabilizer, based on the weight of the base layer, and another base layer can include from 25 wt % to 40 wt % polymer, such as polyvinyl chloride, from 7 wt % to 15 wt % plasticizer, from 40 wt % to 60 wt % filler, and from 2 wt % to 10 wt % stabilizer, based on the weight of this base layer. A third base layer also can be included, or more, having a composition that is the same as or different from the other two base layers. These base layers can include other optional ingredients as mentioned herein. The multiple polymeric base layers can be bonded or otherwise adhered to each other through pressure and/or heat.

The rigid polymeric modular flooring plank of the present invention can have a laminate construction, such as an LVT laminate structure. In the laminate designs, the flooring panel body contains a polymeric base layer portion, which can be referred to as a laminate core, and this core has a top surface. Located or affixed on the top surface of the core is a decorative layer. The decorative layer has a top surface and a bottom surface. As an option, affixed onto the top surface of the decorative layer is an overlay or wear layer having a top surface and a bottom surface. An underlay layer can optionally be located and affixed between the bottom surface of the decorative layer and the top surface of the core. The flooring panel body can optionally have a backing layer.

The decorative layer can be, for example, a PVC film or an aminoplast resin impregnated printed paper. The decorative layer can be, for example, a printed design, such as to simulate various wood grains. The printed design can be any design that is capable of being printed onto the decorative layer. Generally, the decorative layer can be prepared by rotogravure printing techniques or other printing means such as digital printing. Once the paper has the design printed on it, the paper can then be impregnated with an aminoplast resin or mixtures thereof. The aminoplast resin can be, for example, a blend of a urea formaldehyde and a melamine formaldehyde.

As an option, the decorative layer of the flooring panel body can comprise, consist of, consist essentially of, or have, an embossed decorative design.

Once the decorative layer is formed, it can be placed onto the top surface of the polymeric base layer. Simulated grout lines are then formed to delineate individual tiles in the decorative layer, thereby forming a single plank having an appearance of multiple tiles.

The rigid polymeric modular flooring plank of the present invention can further comprise, consist of, consist essentially of, include, or have, an underlay.

The underlay can comprise, consist of, consist essentially of, include, or have, a cushioning layer, a thermal insulating layer, a sound insulating layer, a moisture barrier layer, an impact barrier layer, an electrostatic barrier layer, a pest resistant layer, a mold resistant layer, an odor resistant layer, a rigidity layer, a structural reinforcement layer, a magnetic layer, a floating floor engagement layer, a radiant heat engagement layer, a utility access engagement layer, or any combination thereof.

The underlay can be positioned between the polymeric base layer on the side that faces the sub-flooring structure, i.e. the bottom layer of the polymeric base layer. For example, the bottom surface of the polymeric base layer can include a body proper and an underlayer between the body proper.

The rigid polymeric modular flooring plank of the present invention can further comprise, consist of, consist essentially of, or have, a first adhesive layer, and, optionally, a second adhesive layer. The first and/or second adhesive layer can be located on the bottom side of the polymeric base layer, where the underlay can be located between the first adhesive layer and the bottom side of the polymeric base layer. Alternatively, the underlay can be located between the first adhesive layer and the second adhesive layer.

Any suitable adhesive or combination of adhesives can be used in the first and second adhesive layers.

The present invention also relates to a packaged flooring system that can comprise, consist of, consist essentially of, include, or have, a package holding a plurality of rigid polymeric modular flooring planks of the present invention. The plurality of rigid polymeric modular flooring planks can be stacked on top of one another and parallel to one another while in the package.

Individual flooring planks can include a removable cover sheet to prevent individual flooring planks from adhering to each other in the package. The plurality of flooring planks can be stacked on top of one another and parallel to one another, for example, such that the top surface of one flooring plank is adjacent and parallel to the cover sheet of the next flooring plank. Any number or combination of types of flooring planks can be packaged together to enable the installation of a flooring system of the present invention. Any suitable package can be used, for example, a cardboard box, a crate, a shrink-wrap, a strap, a net, a palate, an envelope, any combination thereof, or the like.

An example of a rigid polymeric modular flooring plank (100) according to the present invention is seen in FIG. 1A. In this example, rigid polymeric modular flooring plank (100) has a tri-hexagonal shape but other shapes are possible. The flooring plank (100) has a top surface (104) that includes the simulated delineated tiles (105) as part of the decorative layer. The flooring plank (100) has outer corners (108) and inner corners (112).

Figure 1B:
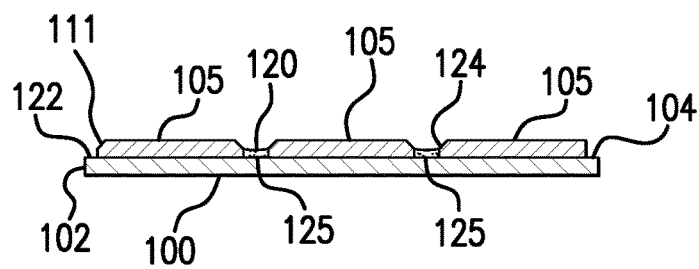
FIG. 1B is a cross-sectional view taken along line B-B from FIG. 1A.

As seen in FIG. 1B, which is a cross-sectional view of rigid polymeric modular flooring plank (100), a simulated grout line (120) appears in top surface (104) and delineates each of the simulated multiple tiles. Simulated grout line (120) has width W (not to scale). Another simulated grout line (122), is at a side of the polymeric plank and has half-width ½W. FIG. 1B shows the decorative grout material (125) present in between the simulated tiles (105). This figure also shows a side-wall (124) or simulated side of one of the multiple tiles and a simulated grout line (120) is shown and having a depth. An optional bevel edge (111) is shown and can be present at each side wall (124).

Figure 1C:
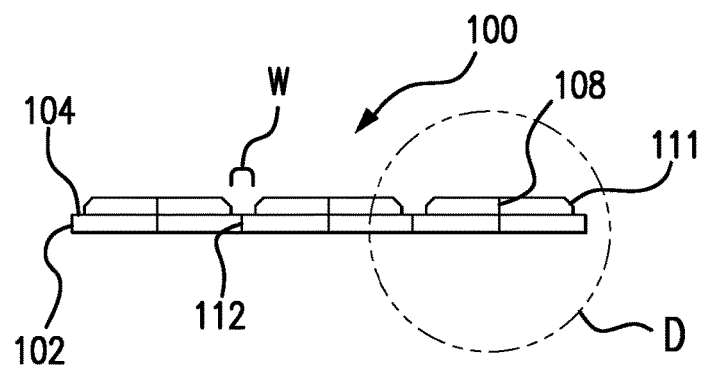
FIG. 1C is a side view of the rigid polymeric modular flooring plank shown in FIG. 1A.

FIG. 1C is a side view of rigid polymeric modular flooring plank (100) seen in FIG. 1A, and FIG. 1C includes an enlarged section D. FIG. 1C also shows the width W of the simulated grout line (120). Bevel edges (111) are also shown. The layers of FIG. 1C, and layers seen in any other figures, are not drawn to scale but are intended to show how the layers can be arranged to form a rigid polymeric modular flooring plank of the present invention.

Figure 1D:
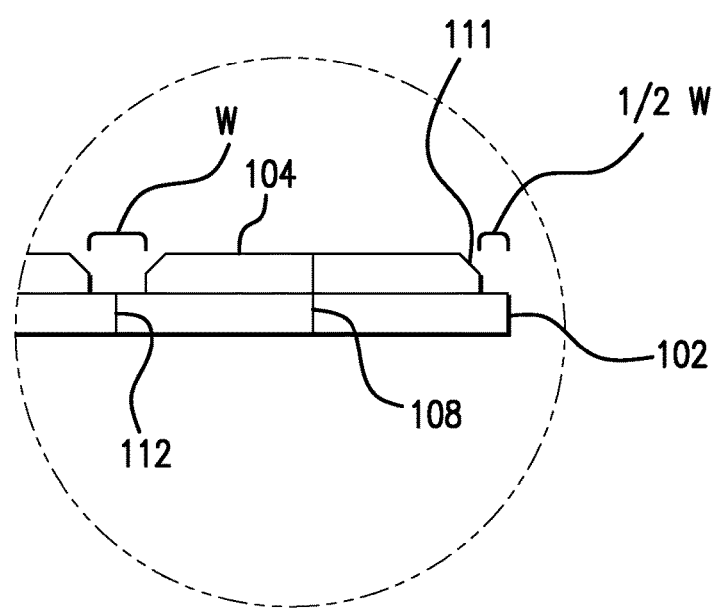
FIG. 1D is an enlarged view of section D taken from FIG. 1C.

Enlarged section D of FIG. 1C is seen in FIG. 1D, where simulated grout line (122) is seen as having a half-width (½W) compared to simulated grout line (120).

Figure 2:
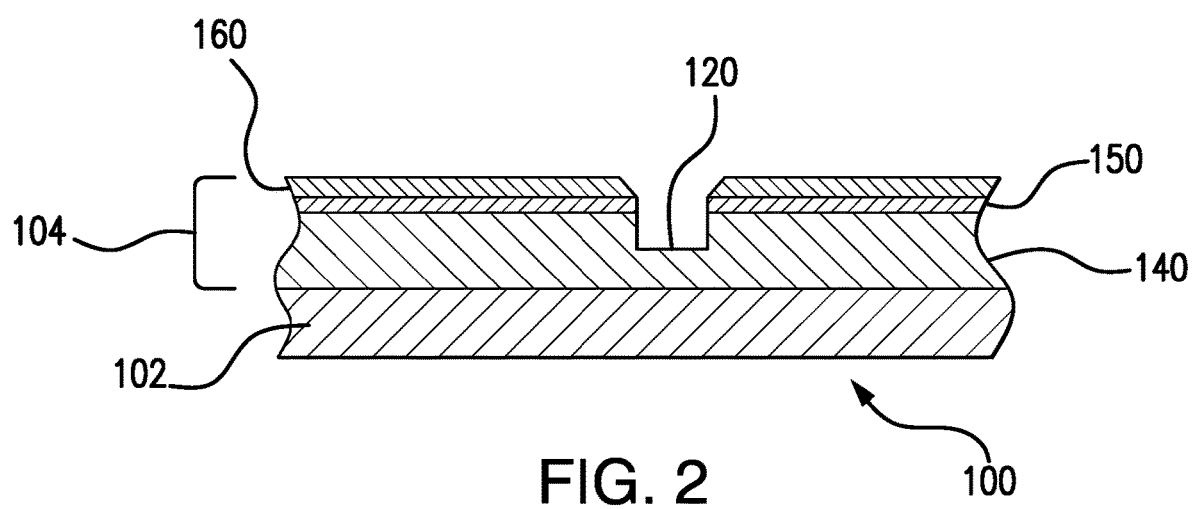
FIG. 2 is a cross-sectional view through a full-thickness section of a rigid polymeric modular flooring plank according to the present invention.

FIG. 2 is a cross-sectional view through a full-thickness section of rigid polymeric modular flooring plank (100). As seen in this figure, top surface (104) is a top surface or upper surface of polymeric base layer (102), where polymeric base layer (102) and top surface (104) can comprise, consist of, consist essentially of, or be, the same material. Alternatively, polymeric base layer (102) and top surface (104) can each comprise, consist of, consist essentially of, or be, two different materials. Alternatively, the multiple visual tiles of the rigid polymeric modular flooring plank (100) can be a laminate of surface (140) and decorative layer (150) present on surface (140). In an aspect of the present invention, rigid polymeric modular flooring plank (100) can have at least one wear layer (160) thereon. Simulated grout line (120) is seen and delineates individual tiles of the multiple tiles. While shown as two layers (140) and (102), what constitutes layers (140) and (102) can be a single layer of the same material.

Another aspect of the present invention relates to a flooring system that comprises, consists of, consists essentially of, includes, or has, a plurality of the rigid polymeric modular flooring planks of the present invention, and includes at least a first rigid polymeric modular flooring plank, and a second rigid polymeric modular flooring plank of the same size and shape as the first rigid polymeric modular flooring plank. In this flooring system, the first rigid polymeric modular flooring plank and the second rigid polymeric modular flooring plank are arranged adjacent to one another, such that one or more of the free edges of the first rigid polymeric modular flooring plank and one or more of free edges of the second rigid polymeric modular flooring plank abut up against each other to form an assembled grouting groove having the depth and full width W of the simulated grout line. Thus, the first rigid polymeric modular flooring plank and the second rigid polymeric modular flooring plank are arranged adjacent to one another in a gap-free juxtaposition.

Figure 3A:
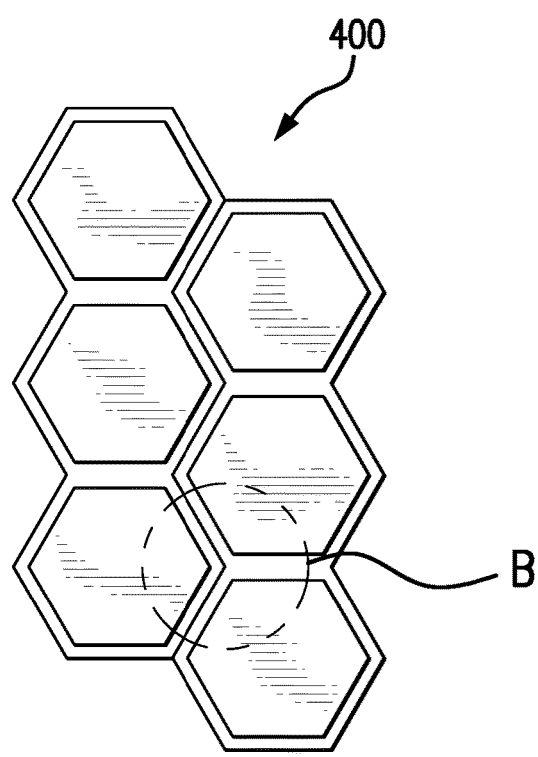
FIG. 3A is a top view of a system of two rigid polymeric modular flooring planks according to the present invention abutting each other forming an assembled flooring system.
Figure 3B:
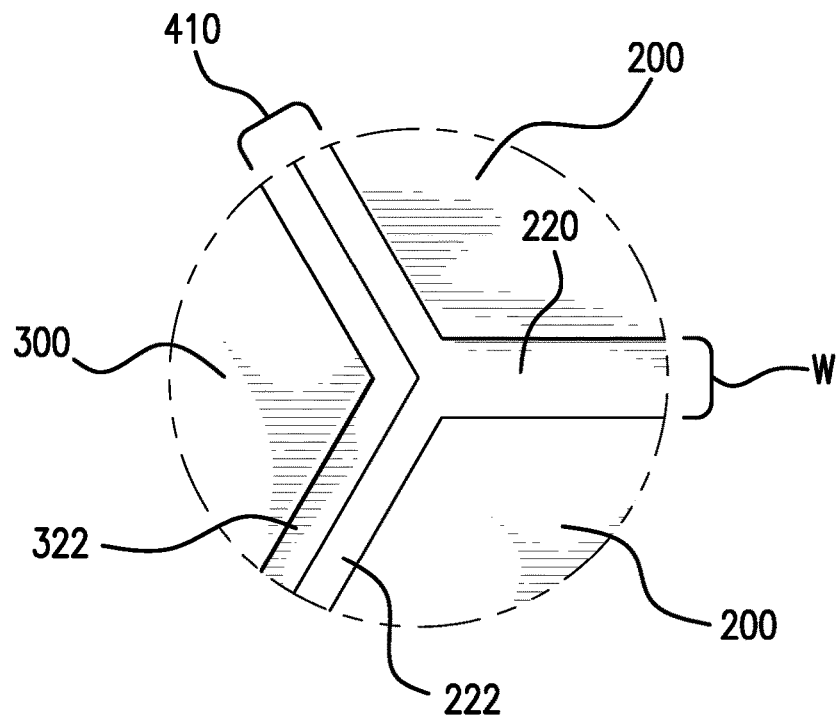
FIG. 3B is an enlarged view of an intersection of the two rigid polymeric modular flooring planks of section B taken from FIG. 3A.

FIGS. 3A and 3B show an example of a flooring system (400). A first tri-hexagonal rigid polymeric modular flooring plank (200) and a second tri-hexagonal rigid polymeric modular flooring plank (300) are placed adjacent to each other in a gap-free juxtaposition. The first and second tri-hexagonal rigid polymeric modular flooring planks can be said to abut each other in this system. FIG. 3A includes an enlarged section B, which is shown in FIG. 3B. An abutting intersection between first tri-hexagonal rigid polymeric modular flooring plank 200 and second tri-hexagonal rigid polymeric modular flooring plank (300) is seen, where a first half-simulated grout line (222) from first tri-hexagonal rigid polymeric modular flooring plank (200) abuts a second half-simulated grout line (322) from second tri-hexagonal rigid polymeric modular flooring plank (300). Each of the first half-simulated grout line (222) and the second half-simulated grout line (322) have half-width (½W), and, upon abutting each other, half-simulated grout lines (222) and (322) form an assembled simulated grout line (410) having full width W.

Figure 4A:
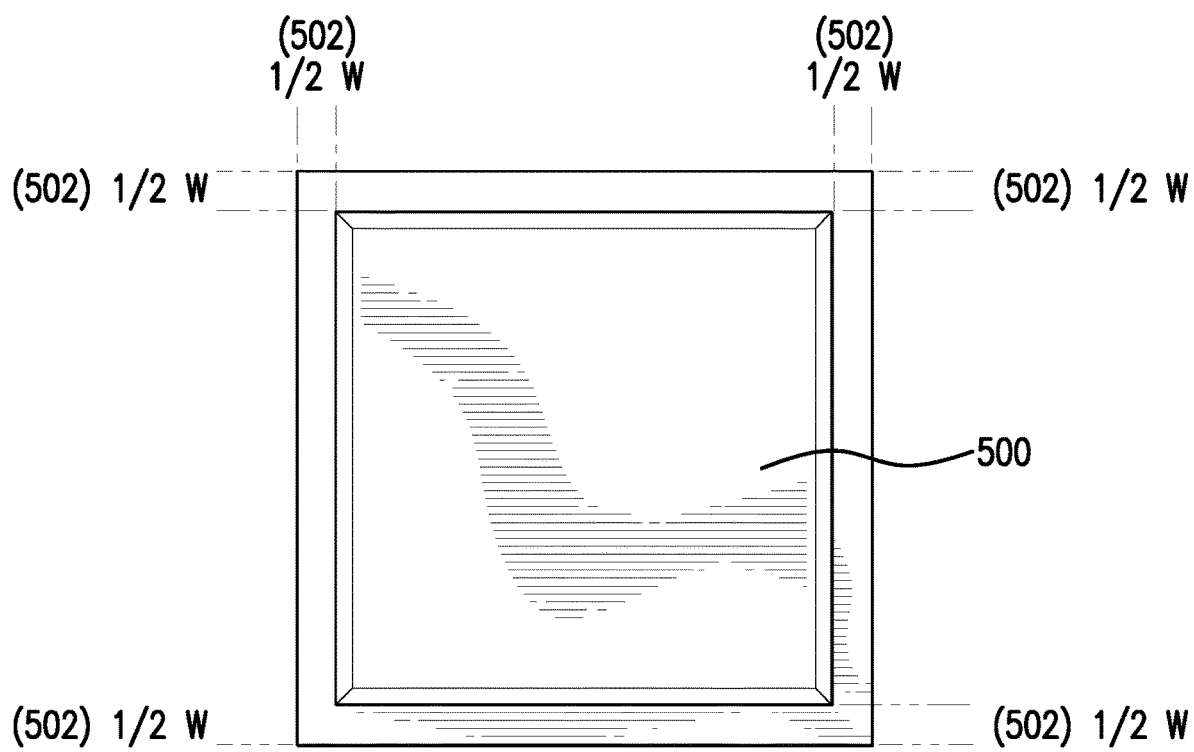
FIG. 4A is a top view of a rigid polymeric modular flooring plank according to the present invention which shows a single simulated tile.
Figure 4B:
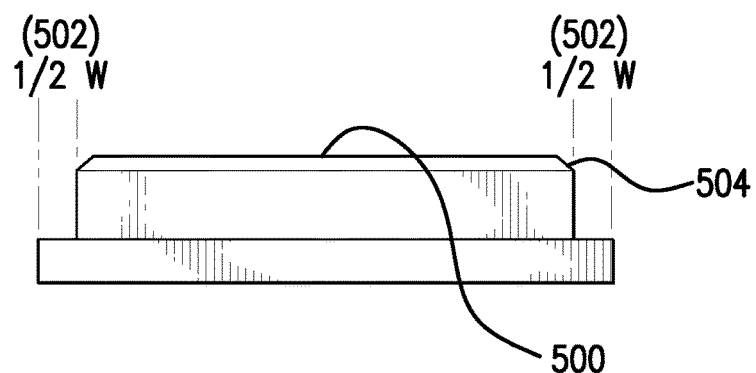
FIG. 4B is a side view of FIG. 4A.

FIGS. 4A and 4B show another example of the flooring plank of the present invention, where just one tile (500) is simulated and the tile (500) has a ½W simulated grout line (502) on each side of tile (500). An optional bevel edge (504) is shown in FIG. 4B.

Figure 5:
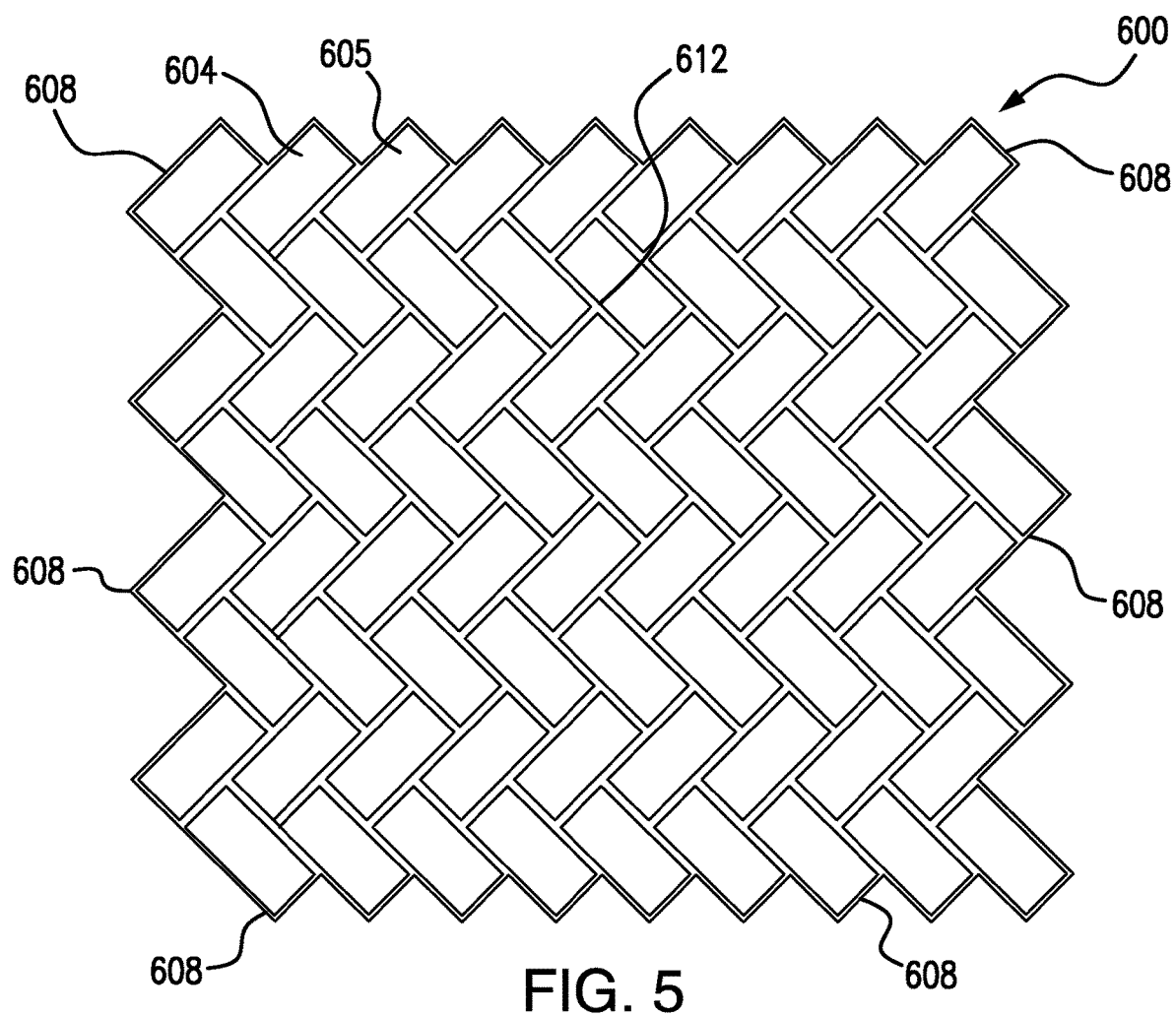
FIG. 5 is a top view of a rigid polymeric modular flooring plank according to a further embodiment of the present invention which shows multiple simulated tiles.

Another example of a rigid polymeric modular flooring plank (600) according to the present invention is seen in FIG. 5. The flooring plank (600) has a top surface (604) that includes the simulated delineated tiles (605) as part of the decorative layer. The flooring plank (600) has outer grout lines (608) that are ½W simulated grout lines and full simulated grout lines in the interior portions of the plank (612). As an example, the width of the plank can be 12 inches by 12 inches or other sizes above and below this amount as mentioned herein.

Figure 6:
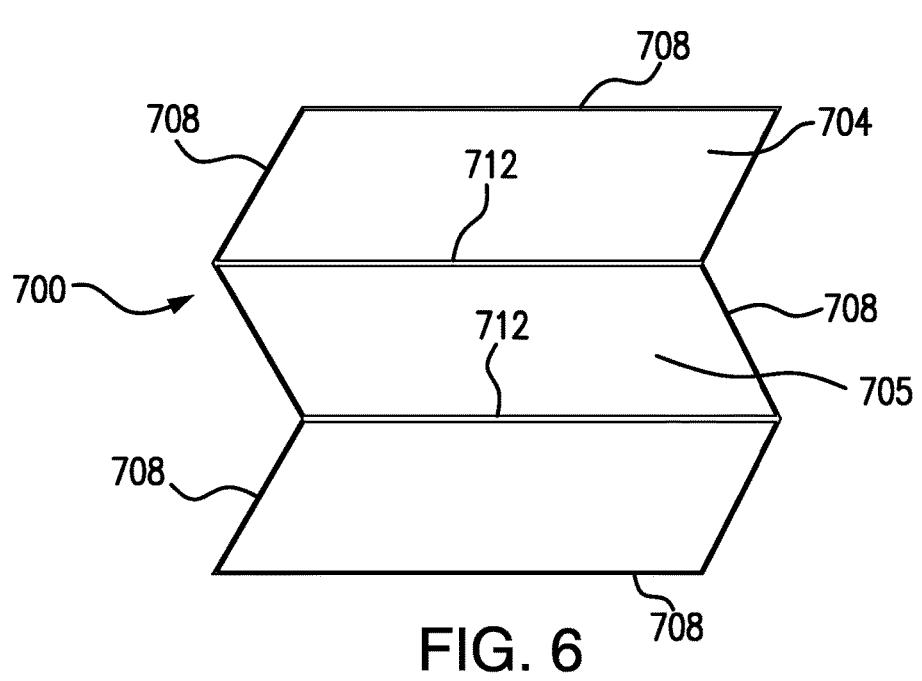
FIG. 6 is a top view of a rigid polymeric modular flooring plank according to a further embodiment of the present invention which shows multiple simulated tiles.

Another example of a rigid polymeric modular flooring plank (700) according to the present invention is seen in FIG. 6. The flooring plank (700) has a top surface (704) that includes the simulated delineated tiles (705) as part of the decorative layer. The flooring plank (700) has outer grout lines (708) that are ½W simulated grout lines and full simulated grout lines in the interior portions of the plank (712). As an example, the width of the plank can be 12 inches by 12 inches or other sizes above and below this amount as mentioned herein.

Figure 7:
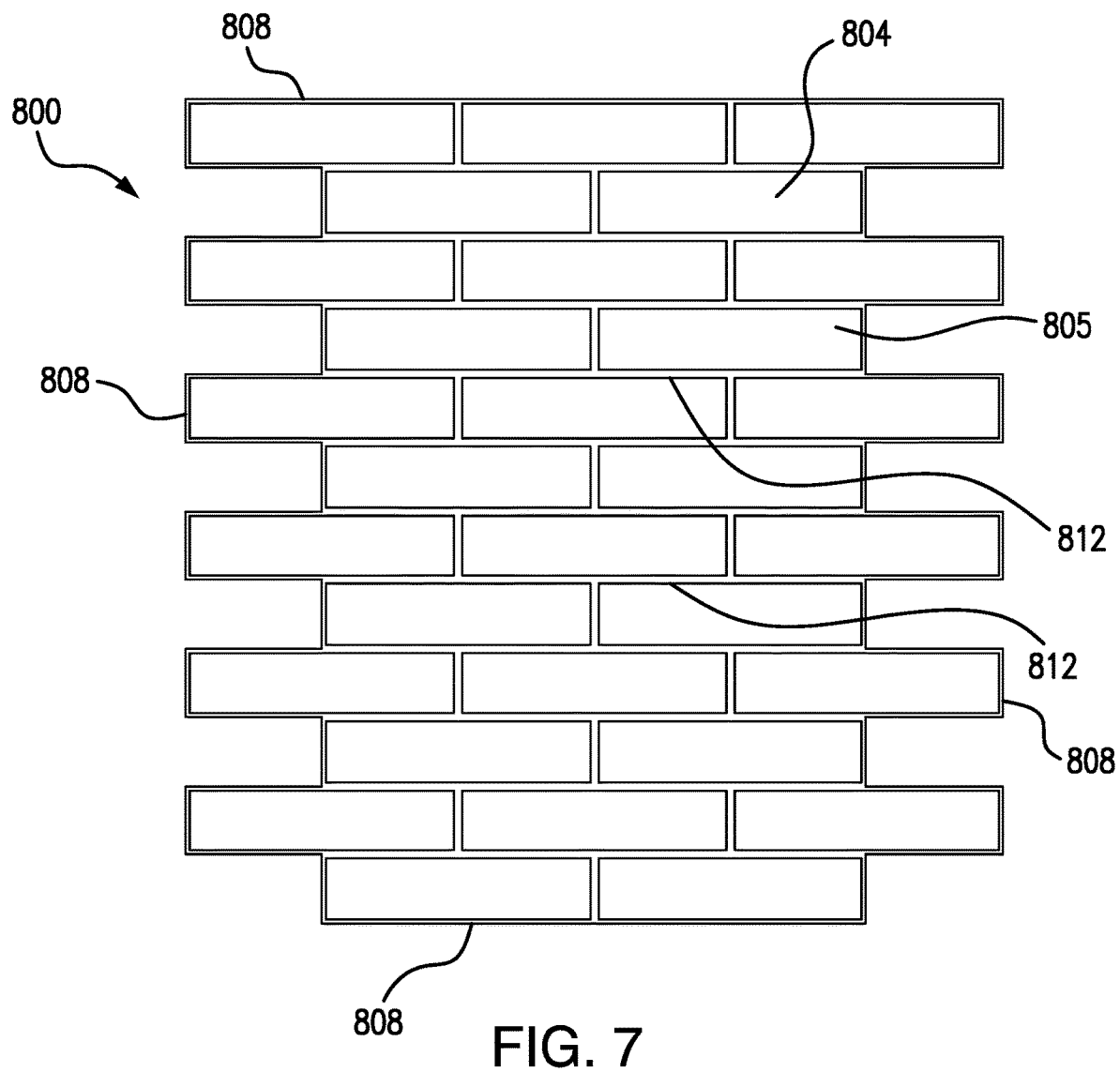
FIG. 7 is a top view of a rigid polymeric modular flooring plank according to a further embodiment of the present invention which shows multiple simulated tiles.

Another example of a rigid polymeric modular flooring plank (800) according to the present invention is seen in FIG. 7. The flooring plank (800) has a top surface (804) that includes the simulated delineated tiles (805) as part of the decorative layer. The flooring plank (800) has outer grout lines (808) that are ½W simulated grout lines and full simulated grout lines in the interior portions of the plank (812). As an example, the width of the plank can be 12 inches by 12 inches or other sizes above and below this amount as mentioned herein.

Figure 8:
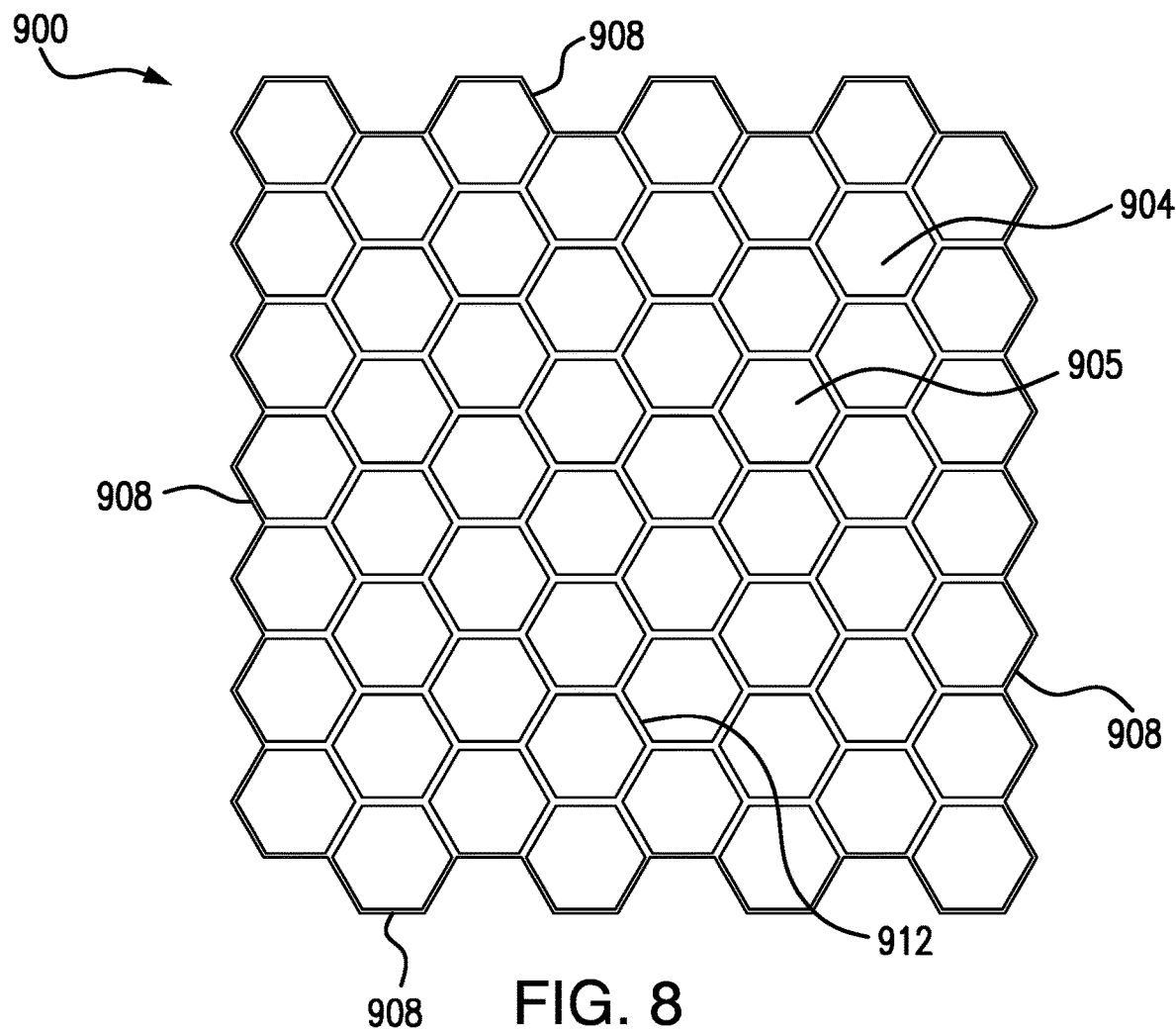
FIG. 8 is a top view of a rigid polymeric modular flooring plank according to a further embodiment of the present invention which shows multiple simulated tiles.

Another example of a rigid polymeric modular flooring plank (800) according to the present invention is seen in FIG. 8. The flooring plank (900) has a top surface (904) that includes the simulated delineated tiles (905) as part of the decorative layer. The flooring plank (900) has outer grout lines (908) that are ½W simulated grout lines and full simulated grout lines in the interior portions of the plank (912). As an example, the width of the plank can be 12 inches by 12 inches or other sizes above and below this amount as mentioned herein.

Figure 9:
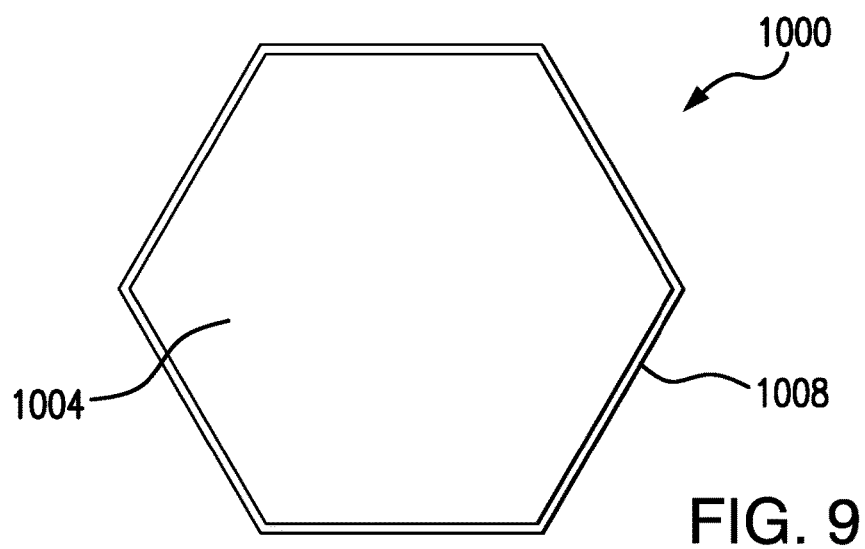
FIG. 9 is a top view of a rigid polymeric modular flooring plank according to a further embodiment of the present invention which shows multiple simulated tiles.

Another example of a rigid polymeric modular flooring plank (1000) according to the present invention is seen in FIG. 9. The flooring plank (1000) has a top surface (1004) that has one simulated tile (1004) as the decorative layer along with the ½W simulated grout lines. The flooring plank (1000) has outer grout lines (1008) that are ½W simulated grout lines and no full simulated grout lines in the interior portions of the plank. As an example, the width of the plank can be 15 inches by 12 inches or other sizes above and below this amount as mentioned herein.

Another aspect of the present invention relates to a method of installing the flooring system of the present invention. The method can comprise, consist of, consist essentially of, include, or have, a step of placing, on a floor, the first rigid polymeric modular flooring plank and the second rigid polymeric modular flooring plank; a step of aligning the first rigid polymeric modular flooring plank and the second rigid polymeric modular flooring plank together such that the first rigid polymeric modular flooring plank and the second rigid polymeric modular flooring plank form an assembled simulated grout line having the depth and full width W of the simulated grout lines having said full width W. Further, the method can comprise, consist of, consist essentially of, include, or have, a step of filling the simulated grouting lines with a decorative grout filler material, caulk or other material.

The filler material can be polymeric (e.g., thermoplastic, silicone, acrylic), cement, cement-like, mortar, mortar-like, decorative grout, or can be or include other materials that can be used to fill in a void or grout line.

In an aspect of the method, the step of aligning is carried out without a spacer located between the first rigid polymeric modular flooring plank and the second rigid polymeric modular flooring plank. As stated earlier, each flooring plank is placed next to each other such that at least one side of the first flooring plank abuts against (e.g. touches) at least one side of the second flooring plank so as to not form any gap between the two flooring planks and this process continues for any number of flooring planks in providing the flooring to an area.

In another aspect of the method, the method can further comprise, consist of, consist essentially of, include, or have, prior to the step of placing, coating the floor with an adhesive composition. Upon the steps of placing and aligning, at least the first rigid polymeric modular flooring plank and the second rigid polymeric modular flooring plank are at least partly immobilized by the adhesive composition.

In another aspect of the method, at least one of the first rigid polymeric modular flooring plank and the second rigid polymeric modular flooring plank comprises, consists of, consists essentially of, includes, or has, a first adhesive layer, and, optionally, a second adhesive layer. In this aspect, the method also further comprises, consists of, consists essentially of, includes, or has, a step of adhering the first rigid polymeric modular flooring plank and the second rigid polymeric modular flooring plank by pressing the first adhesive layer and the optional second adhesive layer against the floor.

A further aspect of the present invention relates to a method of making a rigid polymeric modular flooring plank of the present invention. The method can comprise, consist of, consist essentially of, include, or have, a step of printing the decorative layer having an appearance of a tiled floor.

The method can comprise, consist of, consist essentially of, include, or have, a step of attaching such as by bonding the decorative layer to a top surface of a sheet of the polymeric base layer, and, thereafter, placing at least one wear layer over the decorative layer. The starting plank before being cut into the shape of the polymeric modular flooring plank can have a dimension of 3 ft width or more and a length that is 3 ft or more, such as a length of 4 ft or more or 5 ft or more, or 6 ft or more.

The method can comprise, consist of, consist essentially of, include, or have, a step of routing simulated grout lines into the decorative layer and into the top surface of the polymeric base layer to form simulated grout lines having a depth and a width W. The routing can take place with a computer numeric control (CNC) tool designed to, or configured to, route the rigid polymeric modular flooring plank and form the simulated grout lines. Upon completion of the routing, a sheet is obtained having an appearance of a tiled floor, including simulated grout lines. The previously described bevel edges can be formed at the same time as the grout lines using, for instance, the same tool bit, if bevel edges are desired.

The method can comprise, consist of, consist essentially of, include, or have, a step of cutting the sheet obtained from the routing step, along a series of simulated grout lines, to obtain at least one rigid polymeric modular flooring plank. Upon this cutting, simulated grout lines of half width ½W are formed, and these simulated grout lines of half width form the outer edge that surrounds individual rigid polymeric flooring planks of the present invention.

As an option, the rigid polymeric modular flooring plank of the present invention has no mechanical locking design (e.g., no tongue or groove or similar design) on any side edge of the plank. Thus, in this option, adjacent planks, when the floor is laid is done so without any mechanical locking of the tiles to each other. Thus, with this option, each plank itself and when put down on a floor to form a flooring system is in the absence of any nails, screws, and tongue/grooves. Generally, the formation of the flooring system (the laying down of multiple planks) is achieved solely with adhesive applied to the subfloor and/or to the underneath of the plank or portion thereof (prior to and/or at the time of putting down the floor).

As an option, the rigid polymeric modular flooring plank of the present invention has no mechanical locking design (e.g., no tongue or groove or similar design) on any side edge of the plank. Thus, in this option, adjacent planks, when the floor is laid is done so without any mechanical locking of the tiles to each other. Thus, with this option, each plank itself and when put down on a floor to form a flooring system is in the absence of any nails, screws, and tongue/ grooves. Generally, the formation of the flooring system (the laying down of multiple planks) is achieved without adhesive applied to the subfloor and/or to the underneath of the plank or portion thereof (prior to and/or at the time of putting down the floor), and instead the overall flooring system is secured similar to a floating floor except each individual plank is connected to each adjacent plank or planks with the use of the filler material as described herein.

The present invention includes the following aspects/embodiments/features in any order and/or in any combination:

1. A rigid polymeric modular flooring plank that is one continuous piece having a top surface, a bottom surface and multiple sides defining the edges of said rigid polymeric modular flooring plank, and the rigid polymeric modular flooring plank can include the appearance of one or multiple tiles as part of said top surface with each tile having multiple simulated sides and a decorative surface and each of said tile or multiple tiles completely surrounded by simulated grout lines that have a depth and either have a full width W or a half width ½W, wherein any simulated grout line that is located at any of said multiple sides has said half width and all other simulated grout lines have said full width, wherein said rigid polymeric modular flooring plank comprises a polymeric base layer, a decorative layer and at least one wear layer located above said decorative layer, and wherein said simulated grout lines are formed by removing portions of at least said wear layer and decorative layer.

2. The rigid polymeric modular flooring plank of any preceding or following embodiment/feature/aspect, wherein the rigid polymeric modular flooring plank has a corresponding shape such that an outer edge thereof abuts a second rigid polymeric modular flooring plank of the same size and shape (or complimentary size and shape) of the first rigid polymeric modular flooring plank.

3. The rigid polymeric modular flooring plank of any preceding or following embodiment/feature/aspect, wherein said rigid polymeric modular flooring plank is a luxury vinyl plank.

4. The rigid polymeric modular flooring plank of any preceding or following embodiment/feature/aspect, wherein the decorative layer of the flooring panel body comprises an embossed decorative design.

5. The rigid polymeric modular flooring plank of any preceding or following embodiment/feature/aspect, further comprising an underlayer attached to the rigid polymeric base.

6. The rigid polymeric modular flooring plank of any preceding or following embodiment/feature/aspect, further comprising an underlay.

7. The rigid polymeric modular flooring plank of any preceding or following embodiment/feature/aspect, wherein the underlay comprises a cushioning layer, a thermal insulating layer, a sound insulating layer, a moisture barrier layer, an impact barrier layer, an electrostatic barrier layer, a pest resistant layer, a mold resistant layer, an odor resistant layer, a rigidity layer, a structural reinforcement layer, a magnetic layer, a floating floor engagement layer, a radiant heat engagement layer, a utility access engagement layer, or any combination thereof.

8. The rigid polymeric modular flooring plank of any preceding or following embodiment/feature/aspect, wherein said multiple tiles are positioned in a common plane.

9. The rigid polymeric modular flooring plank of any preceding or following embodiment/feature/aspect, wherein the rigid polymeric modular flooring plank is a form of a circle, a triangle, a square, a non-square rectangle, a pentagon, a hexagon, or a tri-hexagon.

10. The rigid polymeric modular flooring plank of any preceding or following embodiment/feature/aspect, wherein the multiple tile edges include a bevel surface.

11. The rigid polymeric modular flooring plank of any preceding or following embodiment/feature/aspect, wherein said bevel surface has a width of from about 0.01 mm to about 0.1 mm.

12. The rigid polymeric modular flooring plank of any preceding or following embodiment/feature/aspect, wherein the rigid polymeric modular flooring plank has a thickness, and the simulated grout lines having the full width have a width of from about 0.05 inch to about 0.2 inch and a depth in relation to the rigid polymeric modular flooring plank thickness of from about 2% to about 50% of the thickness of the rigid polymeric modular flooring plank.

13. The rigid polymeric modular flooring plank of any preceding or following embodiment/feature/aspect, wherein the rigid polymeric modular flooring plank has a stiffness, as measured by ASTM D1037-12 of from about 1 GPa to about 15 GPa.

14. The rigid polymeric modular flooring plank of any preceding or following embodiment/feature/aspect, wherein the rigid polymeric modular flooring plank has a stiffness, as measured by ASTM D1037-12 of from about 1.5 GPa to about 5 GPa.

15. The rigid polymeric modular flooring plank of any preceding or following embodiment/feature/aspect, wherein the rigid polymeric modular flooring plank has a thickness of from about 4 mm to 15 mm.

16. The rigid polymeric modular flooring plank of any preceding or following embodiment/feature/aspect, wherein said multiple tiles are positioned in a common plane.

17. The rigid polymeric modular flooring plank of any preceding or following embodiment/feature/aspect, wherein the simulated grout lines have a bottom and said bottom is located in the polymeric base layer.

18. The rigid polymeric modular flooring plank of any preceding or following embodiment/feature/aspect, wherein the rigid polymeric modular flooring plank has a surface area of from about 1 square foot to about 4 square feet.

19. The rigid polymeric modular flooring plank of any preceding or following embodiment/feature/aspect, wherein the rigid polymeric modular flooring plank has the appearance of from 1 to 12 tiles and each tile have a cross-sectional area of from about 1.5 square inches to 300 square inches.

20. A flooring system comprising the rigid polymeric modular flooring plank of any preceding or following embodiment/feature/aspect, which is a first rigid polymeric modular flooring plank, and a second rigid polymeric modular flooring plank of the same size and shape as the first rigid polymeric modular flooring plank, wherein the first rigid polymeric modular flooring plank and the second rigid polymeric modular flooring plank are arranged adjacent to one another, such that one or more of the free edges of the first rigid polymeric modular flooring plank and one or more of free edges of the second rigid polymeric modular flooring plank form a simulated grout line having the depth and full width W of the simulated grout lines having said full width W.

21. The flooring system of any preceding or following embodiment/feature/aspect, wherein the first rigid polymeric modular flooring plank and the second rigid polymeric modular flooring plank are arranged adjacent to one another in a gap-free juxtaposition.
22. A method of installing the flooring system of any preceding or following embodiment/feature/aspect, comprising:
    placing, on a floor, the first rigid polymeric modular flooring plank and the second rigid polymeric modular flooring plank,
    aligning the first rigid polymeric modular flooring plank and the second rigid polymeric modular flooring plank together such that the first rigid polymeric modular flooring plank and the second rigid polymeric modular flooring plank are arranged adjacent to one another in a gap-free juxtaposition, and filling the simulated grouting lines with a filler material (e.g., a grout or grout-like filler material).
23. The method of any preceding or following embodiment/feature/aspect, wherein said aligning is carried out without a spacer located between the first rigid polymeric modular flooring plank and the second rigid polymeric modular flooring plank.
24. The method of any preceding or following embodiment/feature/aspect, further comprising:
    prior to said placing, coating the floor with an adhesive composition, wherein
    upon said placing and aligning, the first rigid polymeric modular flooring plank and the second rigid polymeric modular flooring plank are at least partly immobilized by the adhesive composition.
25. The method of any preceding or following embodiment/feature/aspect, wherein at least one of the first rigid polymeric modular flooring plank and the second rigid polymeric modular flooring plank comprises a first adhesive layer, and, optionally, a second adhesive layer, and wherein the method further comprises:
    adhering the first rigid polymeric modular flooring plank and the second rigid polymeric modular flooring plank by pressing the first adhesive layer and the optional second adhesive layer against the floor.

The present invention can include any combination of these various aspects, features, or embodiments above and/or below as set forth in sentences and/or paragraphs. Any combination of disclosed features herein is considered part of the present invention and no limitation is intended with respect to combinable features.

Applicants specifically incorporate the entire contents of all cited references in this disclosure. Further, when an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

It will be apparent to those skilled in the art that various modifications and variations can be made to the embodiments of the present invention without departing from the spirit or scope of the present invention. Thus, it is intended that the present invention covers other modifications and variations of this invention provided they come within the scope of the appended claims and their equivalents.

What is claimed is:

1. A flooring system comprising at least a first rigid polymeric modular flooring plank and a second rigid polymeric modular flooring plank of the same size and shape as the first rigid polymeric modular flooring plank, said first rigid polymeric modular flooring plank and said second rigid polymer flooring plank are each one continuous piece having a top surface, a bottom surface and multiple sides defining the edges of said rigid polymeric modular flooring plank, each of the edges being absent of a mechanical locking design, and the rigid polymeric modular flooring plank includes the appearance of one tile or multiple tiles as part of said top surface with each of said one tile or multiple tiles having multiple edges and a decorative surface and each of said one or multiple tiles completely surrounded by simulated grout lines that have a depth and either have a full width W or a half width ½W, wherein any simulated grout line that is located at any of said one or multiple sides has said half width and all other simulated grout lines have said full width, wherein said first and second rigid polymeric modular flooring plank comprises a polymeric base layer, a decorative layer and at least one wear layer located above said decorative layer, wherein said simulated grout lines are formed by removing portions of at least said wear layer and decorative layer, and
    wherein the first rigid polymeric modular flooring plank and the second rigid polymeric modular flooring plank are arranged adjacent to one another, such that one or more of the free edges of the first rigid polymeric modular flooring plank and one or more of free edges of the second rigid polymeric modular flooring plank form a simulated grout line having the depth and full width W of the simulated grout lines having said full width W, and a filler material is present in said simulated grout line so as to fill said simulated grout line.

2. The flooring system of claim 1, wherein the first rigid polymeric modular flooring plank has a corresponding shape such that an outer edge thereof abuts the second rigid polymeric modular flooring plank of the same size and shape of the first rigid polymeric modular flooring plank.

3. The flooring system of claim 1, wherein said first rigid polymeric modular flooring plank is a luxury vinyl plank.

4. The flooring system of claim 1, wherein the multiple tile edges include a bevel surface.

5. The flooring system of claim 4, wherein said bevel surface has a width of from about 0.01 mm to about 0.1 mm.

6. The flooring system of claim 1, wherein the first rigid polymeric modular flooring plank has a thickness, and the simulated grout lines having the full width have a width of from about 0.05 inch to about 0.2 inch and a depth in relation to the rigid polymeric modular flooring plank thickness of from about 2% to about 50% of the thickness of the first rigid polymeric modular flooring plank.

7. The flooring system of claim 1, wherein the first rigid polymeric modular flooring plank has a stiffness, as measured by ASTM D1037-12 of from about 1 GPa to about 15 GPa.

8. The flooring system of claim 1, wherein the first rigid polymeric modular flooring plank has a stiffness, as measured by ASTM D1037-12 of from about 1.5 GPa to about 5 GPa.

9. The flooring system of claim 1, wherein the first rigid polymeric modular flooring plank has a thickness of from about 4 mm to 15 mm.

10. The flooring system of claim 1, wherein said multiple tiles are positioned in a common plane.

11. The flooring system of claim 1, wherein the simulated grout lines have a bottom and said bottom is located in the polymeric base layer.

12. The flooring system of claim 1, wherein the first rigid polymeric modular flooring plank has a surface area of from about 1 square foot to about 4 square feet.

13. The flooring system of claim 1, wherein the first rigid polymeric modular flooring plank has the appearance of from 1 to 12 tiles and each tile have a cross-sectional area of from about 1.5 square inches to 300 square inches.

14. The flooring system of claim 1, wherein the first rigid polymeric modular flooring plank is a form of a circle, a triangle, a square, a non-square rectangle, a pentagon, a hexagon, or a tri-hexagon.

15. The flooring system according to claim 1, wherein the first rigid polymeric modular flooring plank and the second rigid polymeric modular flooring plank are arranged adjacent to one another in a gap-free juxtaposition.

16. A method of installing the flooring system of claim 1, comprising:
    placing, on a floor, the first rigid polymeric modular flooring plank and the second rigid polymeric modular flooring plank,
    aligning the first rigid polymeric modular flooring plank and the second rigid polymeric modular flooring plank together such that the first rigid polymeric modular flooring plank and the second rigid polymeric modular flooring plank are arranged adjacent to one another in a gap-free juxtaposition, and
    filling the simulated grouting lines with the filler material.

17. The method of claim 16, wherein said aligning is carried out without a spacer located between the first rigid polymeric modular flooring plank and the second rigid polymeric modular flooring plank.

18. The method of claim 16, further comprising:
    prior to said placing, coating the floor with an adhesive composition, wherein
    upon said placing and aligning, the first rigid polymeric modular flooring plank and the second rigid polymeric modular flooring plank are at least partly immobilized by the adhesive composition.

19. The method of claim 16, wherein at least one of the first rigid polymeric modular flooring plank and the second rigid polymeric modular flooring plank comprises a first adhesive layer, and, optionally, a second adhesive layer, and wherein the method further comprises:
    adhering the first rigid polymeric modular flooring plank and the second rigid polymeric modular flooring plank by pressing the first adhesive layer and the optional second adhesive layer against the floor.

* * * * *